United States Patent [19]
Imai

[11] Patent Number: 5,692,114
[45] Date of Patent: Nov. 25, 1997

[54] THREE-DIMENSIONAL PARAMETER INPUT DEVICE AND IMAGE PROCESSING APPARATUS

[75] Inventor: Atsushi Imai, Kanagawa, Japan

[73] Assignee: Sony Corporation, Tokyo, Japan

[21] Appl. No.: 576,760

[22] Filed: Dec. 21, 1995

[30] Foreign Application Priority Data

Dec. 26, 1994 [JP] Japan .................................. 6-338205
[51] Int. Cl.$^6$ .................................................. G06F 15/00
[52] U.S. Cl. .................................................. 395/127
[58] Field of Search .................................. 395/127, 119, 395/140, 141; 345/121, 122, 126

[56] References Cited

U.S. PATENT DOCUMENTS

5,586,232  12/1996  Yoshida .................................. 395/127

Primary Examiner—Phu K. Nguyen
Attorney, Agent, or Firm—William S. Frommer; Alvin Sinderbrand

[57] ABSTRACT

A three-dimensional parameter input device in which the icon composed of the first, second and third regions is displayed on the monitor, it is determined in which region among the first, second and third regions the cursor is positioned when the first definition data is supplied from the input means, the location data or the rotation angle data in the direction of or around X-axis is generated from the location data supplied from the input means and outputted after the supply of the first definition data when the cursor is positioned in the first region, the location data or the rotation angle data in the direction of or around Y-axis is generated from the location data supplied from the input means and outputted after the supply of the first definition data when the cursor is positioned in the second region, and the data showing enlargement ratio or the rotation angle around Z-axis is generated from the location data supplied from the input means and outputted after the supply of the first definition data when the cursor is positioned in the third region; and an image processing apparatus which controls the location and the angle of the input image signal on the display screen based on the generated data.

10 Claims, 6 Drawing Sheets

THREE-DIMENSIONAL PARAMETER INPUT DEVICE AND IMAGE PROCESSING APPARATUS

BACKGROUND OF THE INVENTION

1. Field of the Invention

The present invention relates to a three-dimensional parameter input device and an image processing apparatus which are suitably adapted to a video effect apparatus which operates an object to be operated in an inputted image, for example, by using a mouse.

2. Description of the Related Art

In a video effect apparatus, an object to be operated in an inputted image is given special effects such as movement, enlargement, reduction, change of size and/or location, three-dimensional movement with change, etc., having applications which are almost indefinite in accordance with operation.

Such a video effect apparatus provides a two-dimensional coordinates input device such as a mouse or the like, and an input device for inputting various parameters for three-dimensionally controlling the movement of an object to be operated in an inputted image. In order to give the special effects to an object to be operated in an inputted image with the video effect apparatus, the switch provided in the input device is moved to the point corresponding to the parameter to be operated, and the object to be operated in an image is operated by means of the two-dimensional coordinates input device so as to give the special effects.

In such a video effect apparatus constructed above, in order to give the special effects with both two-dimensional movements and three-dimensional movements to an object to be operated in an image, it is necessary to both operate the two-dimensional coordinates input device and selective switch parameters for controlling three-dimensional movements. In order to give three-dimensional special effects to an object to be operated in an inputted image, therefore, there has been a problem that the two-dimensional coordinates input device should be operated each time after actuation of a switch corresponding to the parameter for controlling the three-dimensional movement, so that the operation becomes complicated.

SUMMARY OF THE INVENTION

In view of the foregoing, an object of the present invention is to provide a three-dimensional parameter input device and an image processing apparatus each of which is superior in operation performance so that parameters for controlling three-dimensional movement can be selectively switched by operating a two-dimensional coordinates input device.

The foregoing object and other objects of the invention have been achieved by the provision of a three-dimensional parameter input device, comprising: a monitor; icon display means for displaying the icon composed of the first, second and third regions on the monitor; input means for inputting the location data and the definition data; cursor display means for displaying the cursor at the position on the display surface of the monitor corresponding to the location data; determination means for determining in which region among the first, second and third regions the cursor is positioned when the first definition data is supplied from the input means; and parameter generation means for generating and outputting the X-directional location data or the data of amount of movement in the direction of X-axis from the location data supplied from the input means after the supply of the first definition data when the cursor is positioned in the first region, for generating and outputting the Y-directional location data or the data of amount of movement in the direction of Y-axis from the location data supplied from the input means after the supply of the first definition data when the cursor is positioned in the second region, and for generating and outputting the data showing enlargement ratio from the location data supplied from the input means after the supply of the first definition data when the cursor is positioned in the third region, based on the determination result of the determination means.

Further, the present invention provides the three-dimensional parameter input device, comprising: a monitor; icon display means for displaying the icon composed of the first, second and third regions on the monitor; input means for inputting the location data and the definition data; cursor display means for displaying the cursor at the position on the display surface of the monitor corresponding to the location data; determination means for determining in which region among the first, second and third regions the cursor is positioned when the first definition data is supplied from the input means; and parameter generation means for generating and outputting the rotation data around X-axis or the data of amount of rotation around X-axis from the location data supplied from the input means after the supply of the first definition data when the cursor is positioned in the first region, for generating and outputting the rotation data around Y-axis or the data of amount of rotation around Y-axis from the location data supplied from the input means after the supply of the first definition data when the cursor is positioned in the second region, and for generating and outputting the rotation data around Z-axis or the data of amount of rotation around Z-axis from the location data supplied from the input means after the supply of the first definition data when the cursor is positioned in the third region, based on the determination result of the determination means.

Further, the present invention provides an image processing apparatus, comprising: a monitor; icon display means for displaying the icon composed of the first, second and third regions on the monitor; input means for inputting the location data and the definition data; cursor display means for displaying the cursor at the position on the display surface of the monitor corresponding to the location data; determination means for determining in which region among the first, second and third regions the cursor is positioned when the first definition data is supplied from the input means; parameter generation means for generating and outputting the X-directional location data or the data of amount of movement in the direction of X-axis from the location data supplied from the input means after the supply of the first definition data when the cursor is positioned in the first region, for generating and outputting the Y-directional location data or the data of amount of movement in the direction of Y-axis from the location data supplied from the input means after the supply of the first definition data when the cursor is positioned in the second region, and for generating and outputting the data showing enlargement ratio from the location data supplied from the input means after the supply of the first definition data when the cursor is positioned in the third region, based on the determination result of the determination means; and image processing means for processing an input image signal based on the data outputted from the parameter generation means, and for controlling the location and the size on the display screen of the input image signal.

Further, the present invention provides the image processing apparatus, comprising: a monitor; icon display means for displaying the icon composed of the first, second and third regions on the monitor; input means for inputting the location data and the definition data; cursor display means for displaying the cursor at the position on the display surface of the monitor corresponding to the location data; determination means for determining in which region among the first, second and third regions the cursor is positioned when the first definition data is supplied from the input means; and parameter generation means for generating and outputting the rotation data around X-axis or the data of amount of rotation around X-axis from the location data supplied from the input means after the supply of the first definition data when the cursor is positioned in the first region, for generating and outputting the rotation data around Y-axis or the rotation data around Y-axis from the location data supplied from the input means after the supply of the first definition data when the cursor is positioned in the second region, and for generating and outputting the rotation data around Z-axis or the rotation data around Z-axis from the location data supplied from the input means after the supply of the first definition data when the cursor is positioned in the third region, based on the determination result of the determination means; and image processing means for processing an input image signal based on the data outputted from the parameter generation means, and for controlling the angle on the display screen of the input image signal.

The nature, principle and utility of the invention will become more apparent from the following detailed description when read in conjunction with the accompanying drawings in which like parts are designated by like reference numerals or characters.

DETAILED DESCRIPTION OF THE EMBODIMENT

Figure 1:
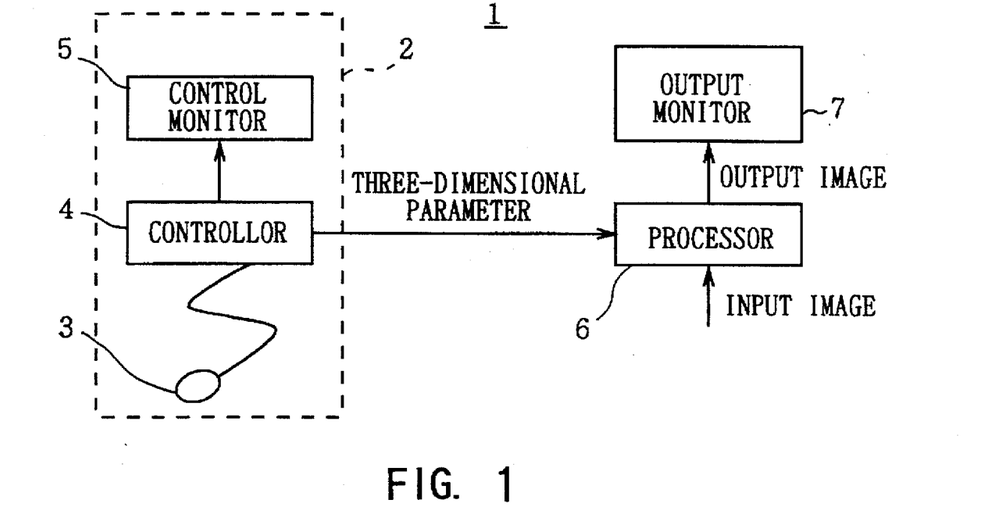
FIG. 1 is a block diagram showing an embodiment of the three-dimensional parameter input device and the image processing apparatus according to the present invention.

Preferred embodiments of the present invention will be described with reference to the accompanying drawings:

In FIG. 1, a video effect apparatus 1 as an image processing apparatus is constituted with a three-dimensional parameter input portion 2, a processor 6, and an output monitor 7. The three-dimensional parameter input portion 2 is constituted with a mouse 3 as an input means connected to a controller 4 and a control monitor 5 for displaying controlling icons. That is, in the video effect apparatus 1, a cursor 9 described below (FIG. 2) is positioned by the mouse 3 into a controlling icon displayed on the control monitor 5 and the controlling icon is clicked by the mouse 3, so that a two-dimensional or three-dimensional parameter (hereinafter, referred to as parameter) according to the clicked controlling icon is supplied to the processor 6 which in turn supplies to the output monitor 7 a controlled image in accordance with the parameter.

Figure 2:
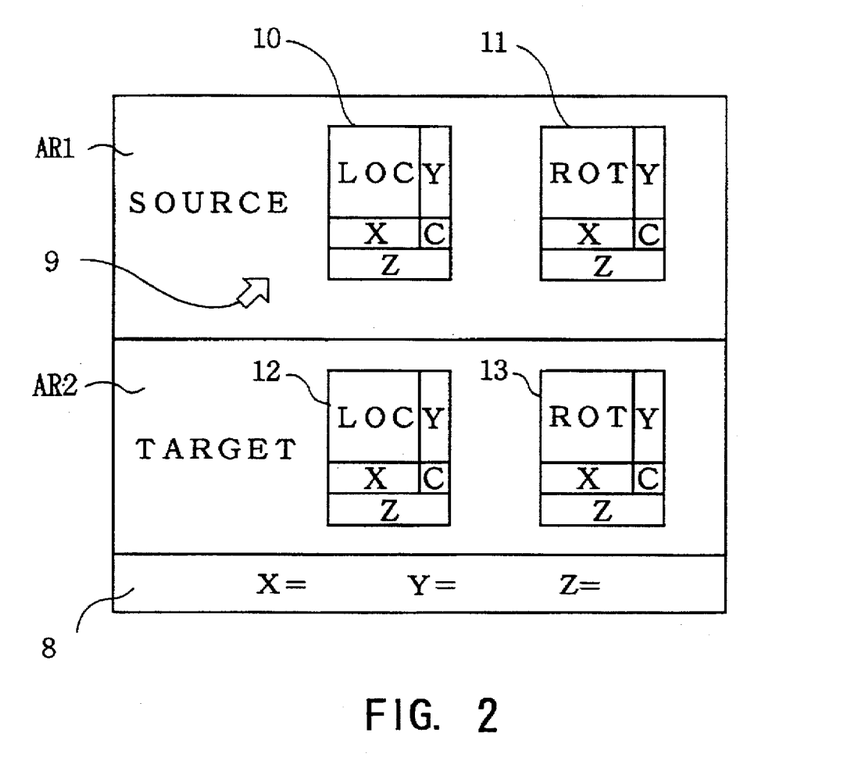
FIG. 2 is a schematic diagram showing an example of display of the control monitor of the three-dimensional parameter input device and the image processing apparatus shown in FIG. 1.

In FIG. 2, there are provided an area 1 (AR1), an area 2 (AR2), and a coordinates display portion 8 on the display screen of the control monitor 5. The area 1 is constituted by a first controlling icon for controlling the position of an object to be operated in an image on the basis of the three-dimensional coordinates to the image to be operated (this is referred to as the control by SOURCE side), and the first controlling icon is constituted by a location controlling icon 10 and a rotation controlling icon 11. The area 2 is constituted by a second controlling icon for controlling the position of the object to be operated in the image on the basis of the virtual three-dimensional coordinates on the screen of the output monitor 7 (this is referred to as the control by TARGET side), and the second controlling icon is constituted by a location controlling icon 12 and a rotation controlling icon 13, similarly to the area 1. The coordinates display portion 8 displays the locations, on X-, Y- and Z-axes, and the enlargement ratio of the object to be operated in the image displayed on the output monitor 7 in the numerical values.

The location controlling icons 10 and 12, and rotation controlling icons 11 and 13 are respectively constituted by first control regions for controlling two-dimensional information and second control regions for controlling the third-dimensional information. Each of the location controlling icons 10 and 12 is constituted by five icons of LOC (location), X, Y, C and Z. For example, the icon X, as the first region, controls only the X-directional movement of the object to be operated in the image, so that if the mouse cursor 9 is positioned in the region of the icon X and clicked by the mouse 3, a parameter corresponding to the icon X is supplied to the processor 6 from the controller 4. The processor 6 moves the object to be operated in the image displayed on the output monitor 7 by a defined amount based on the supplied parameter. Similarly to the icon X, the icon Y, as the second region, controls only the Y-directional movement of the object to be operated in the image. It is also possible to move the object to be operated in the directions of X- and Y-axes at the same time by selecting the icon LOC. Further, the icon Z, as the third region, controls the size of the object to be operated in the image (the enlargement ratio), and the icon C can return the object to be operated in the image to its initial state.

Each of the rotation controlling icons 11 and 13 is constituted by five icons of ROT (rotation), X, Y, C and Z. The icon X controls the rotation around the X-axis of the object to be operated in the image, the icon Y controls the rotation around the Y-axis of the object to be operated in the image, and the icon Z controls the rotation around the Z-axis of the object to be operated in the image. The rotation of the object to be operated in the image can be returned to its initial state by controlling the icon C. Further, it is also possible to rotate the object to be operated in the image around the axis perpendicular to the direction along which the cursor 9 by selecting the icon ROT.

Next, the detailed description of the controller 4 shown in FIG. 1 will be given below with reference to FIG. 3.

Figure 3:
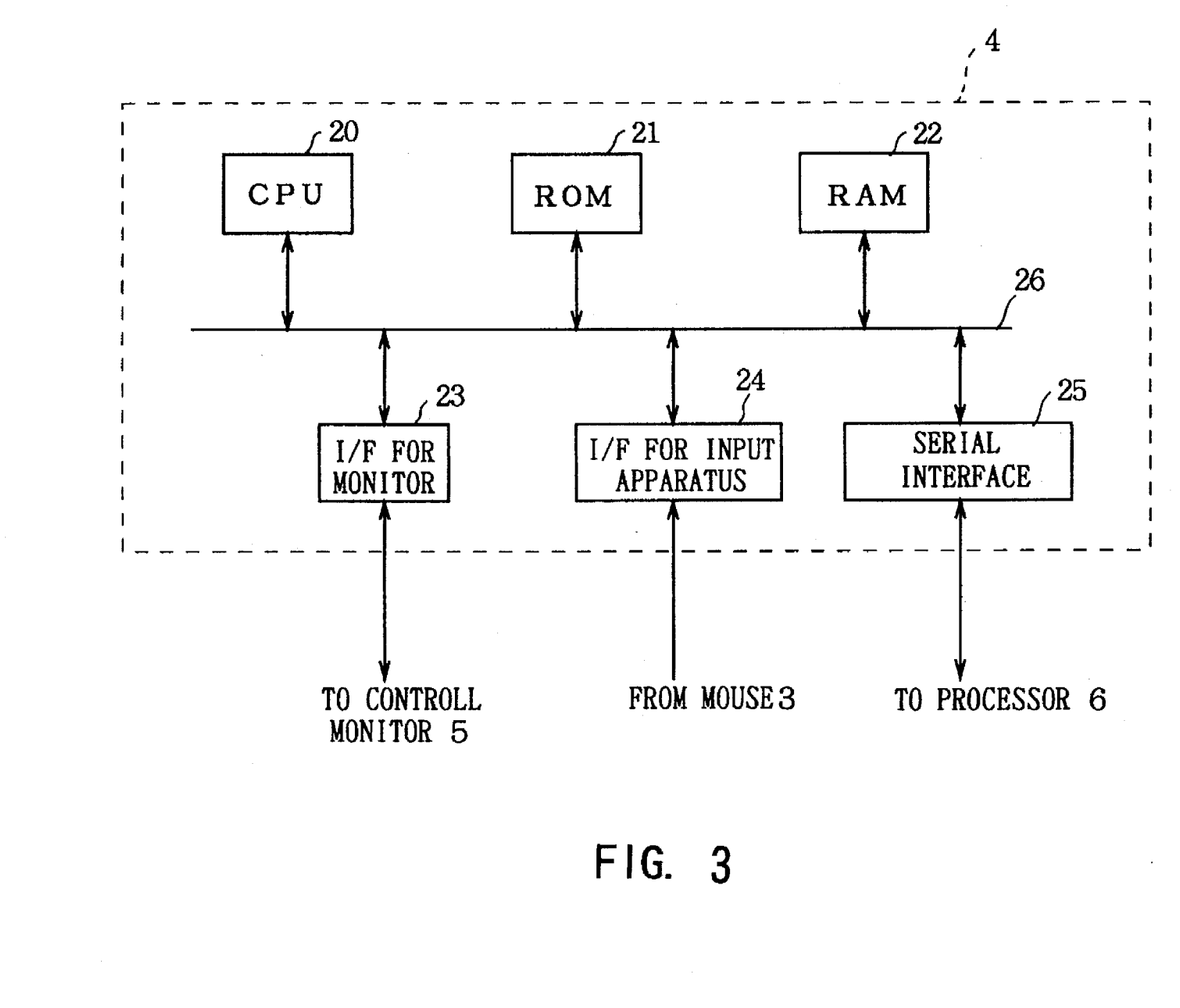
FIG. 3 is a block diagram showing in detail the controller of the three-dimensional parameter input device and the image processing apparatus shown in FIG. 1.

In FIG. 3, the controller 4 has the construction in which a CPU 20 as cursor display means, determination means, and parameter generation means; a ROM 21 which stores the software program data for the operation of the CPU 20; a RAM 22 for storing the data for generation of the character, the data supplied from the mouse 3, the data on the processing, and so on; an interface 23 for the monitor for serving as an interface for the control monitor 5; an interface 24 for the input device for serving as an interface to the mouse 3; and a serial interface 25 for transmitting and receiving the data to and from the processor 6 are connected with each other via a bus 26.

In the above configuration, in the video effect apparatus 1, the cursor 9 is positioned by means of the mouse 3 in the region of the controlling icon to be operated on the control monitor 5 and clicked, so that command information is inputted. For example, when the icon Y of the location controlling icon 10 is clicked, the movement of the mouse 3 controls only the Y-directional movement of the object to be operated in the image on the output monitor 7. Accordingly, when the object to be operated in the image on the output monitor 7 has reached a desired position on the Y-axis, clicking the mouse 3 again releases the control. At that time, the coordinate values of the coordinates display portion 8 show numerical values changed by a amount of movement.

Next, if the icon X in the rotation controlling icon 11 is clicked, the object to be operated in the image on the output monitor 7 can be rotated around the X-axis by an amount of movement of the mouse 3. After the rotation reaches a desired position, the control of rotation is released by clicking the mouse 3 again.

Further, if the icon X of the location controlling icon 12 is clicked, the movement of the mouse 3 controls the X-directional movement on the point of view toward the object to be operated in the image on the output monitor 7. Accordingly, when the object to be operated in the image on the screen of the output monitor 7 has reached a desired position on the X-axis, the mouse 3 is clicked again so that the control is released. Thus, the operator can give special effects on the object to be operated in the image on the output monitor 7 by freely operating the control of the object to be operated in the image while confirming the movement of the image on the output monitor 7 corresponding to the variety of movement of the mouse 3.

Then, the description of the operation procedure by the CPU 20 will be Given below with reference to the flow charts of FIGS. 4, 5, 6, and 7.

Figure 4:
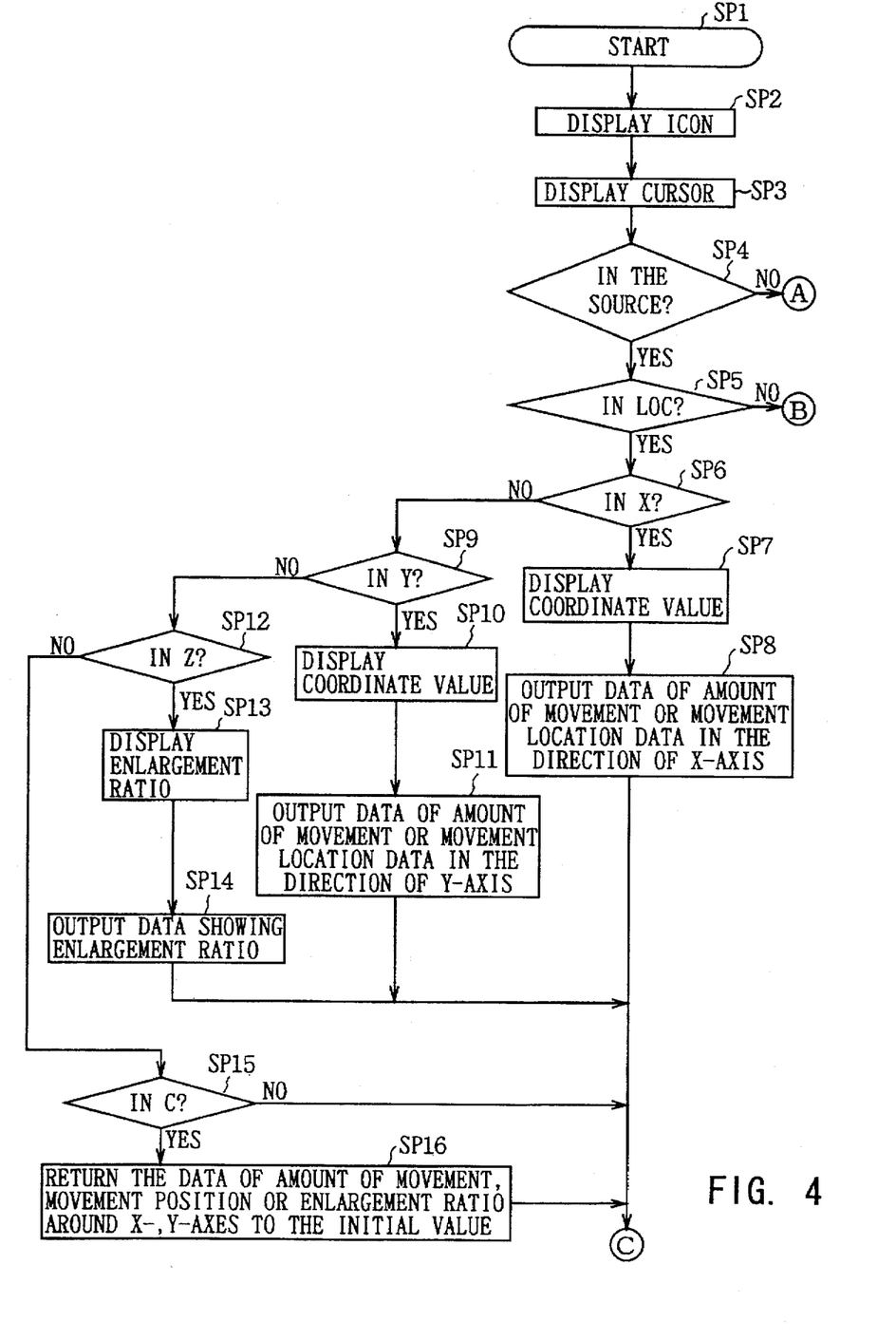
FIGS. 4, 5, 6, and 7 are flow charts explaining the operation of the controller shown in FIG. 3.

The CPU 20 starts operating from step SP1.

At step SP2, the CPU 20 captures the data for generating the character which has been stored in the RAM 22, generates the data showing the icons shown in FIG. 2, and then supplies it to the control monitor 5 via the interface 23 for the monitor. Thus, the icons shown in FIG. 2 are displayed on the control monitor 5.

Then, at step SP3, the CPU 20 captures the data for generating the cursor which has been stored in the RAM 22, generates the data representing the cursor shown in FIG. 2, and then supplies it to the control monitor 5 via the interface 23 for the monitor. Thus, the cursor 9 shown in FIG. 2 is displayed on the control monitor 5.

Then, at step SP4, the CPU 20 moves the cursor 9 to the position corresponding to the location data supplied from the mouse 3, and determines whether or not the position of the cursor 9 is in the source region on the screen of the control monitor 5 when the click data is supplied from the mouse 3. If the affirmative result is obtained that the cursor 9 is positioned in the source region, the CPU 20 proceeds to step SP5. Incidentally, at step SP4, the CPU 20 supplies the data showing that the cursor is positioned in the source region to the processor 6. On and after that, the processor 6 controls the object to be operated on the SOURCE side based on the data of amount of movement, the movement location data, the data of amount of rotation, the rotation angle data, or the enlargement ratio data each of which are supplied from the controller 4.

Then, at step SP5, the CPU 20 determines whether or not the cursor 9 is positioned in the location controlling icon 10. If an affirmative result is obtained that the cursor 9 is in the location controlling icon 10, the CPU 20 proceeds to step SP6.

Then, at step SP6, the CPU 20 determines whether or not the cursor 9 is positioned in the icon X of the location controlling icon 10. If the affirmative result is obtained that the cursor 9 is in the icon X, the CPU 20 proceeds to step SP7.

At step SP7, the CPU 20 supplies the location data supplied from the mouse 3 to the control monitor 5 in cooperation with the movement of the mouse 3 after one click data being supplied from the mouse 3 while passing through step SP4 to step SP6, and displays the coordinate value at that time on the coordinates display portion 8. At that time, the controlled item selected by the cursor 9 is on the X-directional position, so that only the location data displayed as "X=" in the coordinate display portion 8 changes its value in accordance with the movement of the mouse 3.

Then, at step SP8, the CPU 20 generates the data of amount of movement in the direction of X-axis or the location data of X-directional movement based on the location data supplied to the control monitor 7 at step SP7, supplies it to the processor 6 via the serial interface 25, and then proceeds to step SP60 to terminate the operation.

At this time, the processor 6 moves the object to be operated by the defined amount in the direction of X-axis based on the data of amount of movement in the direction of X-axis or the location data of the X-directional movement each of which are supplied at step SP8.

If a negative result is obtained at step SP6 in which the cursor 9 is not positioned in the icon X, the CPU 20 proceeds to step SP9.

At step SP9, the CPU 20 determines whether or not the cursor 9 is positioned in the icon Y of the location controlling icon 10. If an affirmative result is obtained that the cursor 9 is in the icon Y, the CPU 20 proceeds to step SP10.

At step SP10, the CPU 20 supplies the location data supplied from the mouse 3 to the control monitor 5 in cooperation with the movement of the mouse 3 after one click data being supplied from the mouse 3 while passing through step SP4 to steps SP6 and SP9, and displays the coordinate value at that time on the coordinates display portion 8. At that time, the controlled item selected by the cursor 9 is on the Y-directional position, so that only the location data displayed as "Y=" in the coordinate display portion 8 changes its value in accordance with the movement of the mouse 3.

Then, at step SP11, the CPU 20 generates the data of amount of movement in the direction of Y-axis or the location data of Y-directional movement, supplies it to the processor 6 via the serial interface 25, and then proceeds to step SP60 to terminate the operation.

At this time, the processor 6 moves the object to be operated by the defined amount in the direction of Y-axis based on the data of amount of movement in the direction of Y-axis or the location data of Y-directional movement each of which are supplied at step SP11.

Incidentally, if a negative result is obtained that the cursor 9 is not positioned in the icon Y at step SP9, the CPU 20 proceeds to step SP12.

At step SP12, the CPU 20 determines whether or not the cursor 9 is positioned in the icon Z of the location controlling icon 10. If an affirmative result is obtained that the cursor 9 is positioned in the icon Z, the CPU 20 proceeds to step SP13. At step SP13, the CPU 20 supplies the location data supplied from the mouse 3 to the control monitor 5 in cooperation with the movement of the mouse 3 after one click data being supplied from the mouse 3 while passing through step SP4 to step SP6, step SP9 and step SP12, and displays the enlargement ratio at that time on the coordinates display portion 8. At that time, the controlled item selected by the cursor 9 is the enlargement ratio, so that only the enlargement ratio data displayed as "Z=" in the coordinate display portion 8 changes its value in accordance with the movement of the mouse 3.

Then, at step SP14, the CPU 20 generates the data showing the enlargement ratio based on the same location data as which is supplied to the control monitor 5 at step SP13, supplies it to the processor 6 via the serial interface 25, and then proceeds to step SP60 to terminate the operation.

At this time, the processor 6 enlarges or reduces the object to be operated to a defined size based on the data showing the enlargement ratio supplied at step SP14.

Incidentally, at steps SP8, SP11 and SP14, the CPU 20 retains the data of amount of movement or the movement location data in the directions of X- and Y-axes, or the enlargement ratio data at the time when a click data is supplied from the mouse 3, and keeps supplying the data to the processor 6: or at steps SP8, SP11 and SP14, the CPU 20 supplies the retainment command data to the processor 6 so as to retain the data of amount of movement in the direction of X- and Y-axes, or the enlargement ratio data at the time when a click data is supplied from the mouse 3.

If a negative result is obtained that the cursor 9 is not positioned in the icon Z at step SP12, the CPU 20 proceeds to step SP15.

At step SP15, the CPU 20 determines whether or not the cursor 9 is positioned in the icon C of the location controlling icon 10. If an affirmative result is obtained that the cursor 9 is positioned in the icon C, the CPU 20 proceeds to step SP16.

Incidentally, the determinations by the CPU 20 at steps SP5, SP6, SP9, SP12 and SP15 are executed based on the position of the cursor 9 at the time when the click data is supplied from the mouse 3 at step SP4.

At step SP16, the CPU 20 returns the data of amount of movement in the direction of X- and/or Y-axes, X- and/or Y-directional movement location data, and/or the enlargement ratio data set at steps SP6 to SP14 to the initial value, and then supplies the initial value to the processor 6. Then, the CPU 20 proceeds to step SP60 to terminate the operation.

At this time, the processor 6 moves and returns the object to be operated to the position and the size each shown by the initial value.

If a negative result is obtained that the cursor 9 is not positioned in the icon C at step SP15, the CPU 20 proceeds to step SP60 to terminate the operation.

Incidentally, at step SP5, if a negative result is obtained that the cursor 9 is not positioned in the location controlling icon 10, the CPU 20 proceeds to step SP17.

Figure 5:
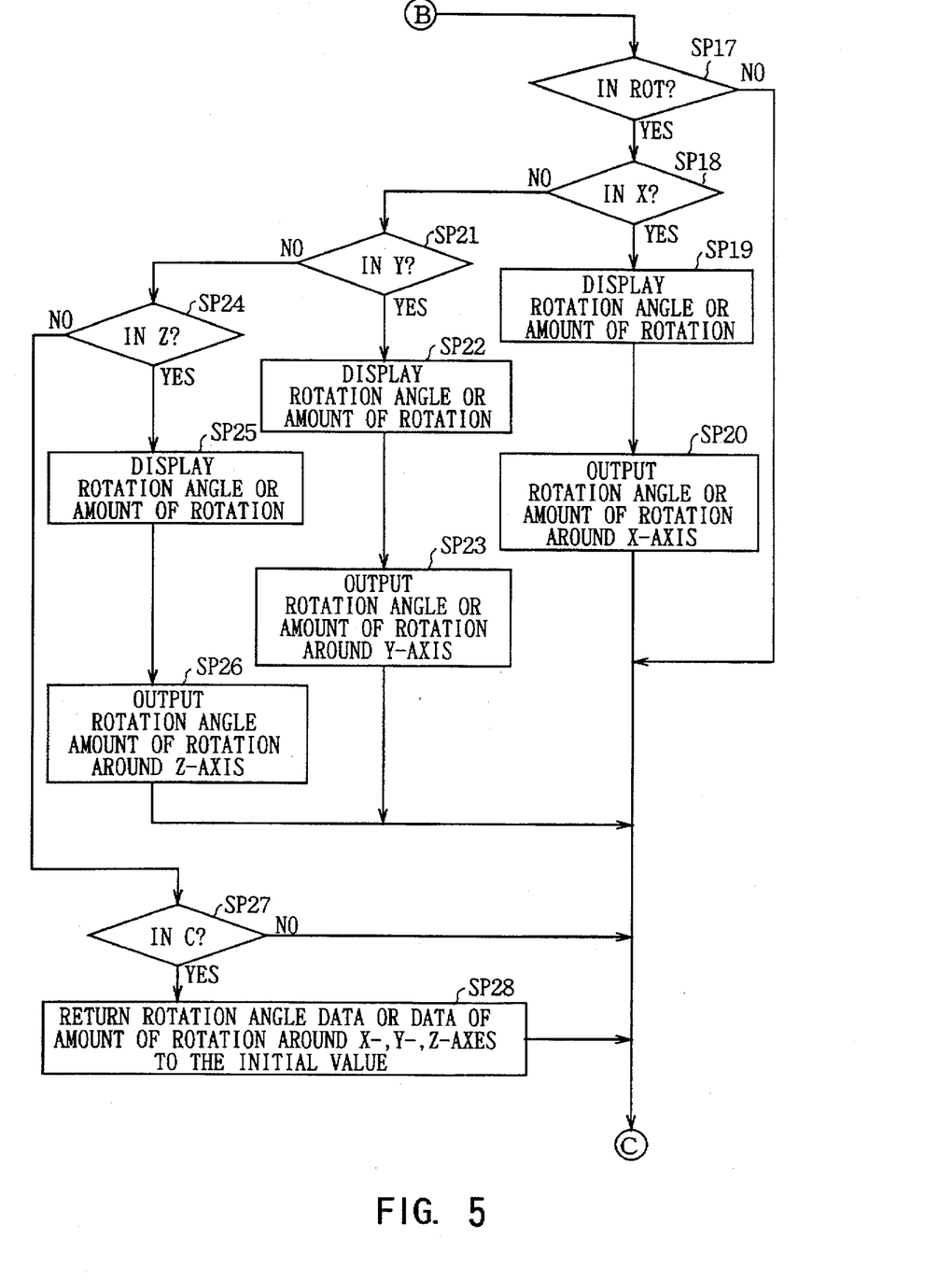

At step SP17, the CPU 20 determines whether or not the cursor 9 is positioned in the rotation controlling icon 11. If an affirmative result is obtained that the cursor 9 is positioned in the rotation controlling icon 11, the CPU 20 proceeds to step SP18.

At step SP18, the CPU 20 determines whether or not the cursor 9 is positioned in the icon X of the rotation controlling icon 11. If an affirmative result is obtained that the cursor 9 is positioned in the icon X, the CPU 20 proceeds to step SP19.

At step SP19, the CPU 20 supplies the location data supplied from the mouse 3 to the control monitor 5 in cooperation with the movement of the mouse 3 after one click data being supplied from the mouse 3 while passing from steps SP4, SP5, SP17 and SP18, and displays the rotation angle or the amount of rotation at that time on the coordinates display portion 8 in the numerical value. At that time, the controlled item selected by the cursor 9 is the rotation around the X-axis, so that only the rotation data displayed as "X=" in the coordinate display portion 8 changes its value in accordance with the movement of the mouse 3.

Then, at step SP20, the CPU 20 generates the data of amount of rotation or the rotation angle data around the X-axis based on the same rotation data as which is supplied to the control monitor 5 at step SP19, supplies it to the processor 6 via the serial interface 25, and then proceeds to step SP60 to terminate the operation.

At this time, the processor 6 rotates the object to be operated by a defined amount based on the data of amount of rotation or the rotation angle data around the X-axis supplied at step SP20.

If a negative result is obtained that the cursor 9 is not positioned in the icon X at step SP18, the CPU 20 proceeds to step SP21.

At step SP21, the CPU 20 determines whether or not the cursor 9 is positioned in the icon Y of the rotation controlling icon 11. If an affirmative result is obtained that the cursor 9 is positioned in the icon Y, the CPU 20 proceeds to step SP22. At step SP22, the CPU 20 supplies the location data supplied from the mouse 3 to the control monitor 5 in cooperation with the movement of the mouse 3 after one click data being supplied from the mouse 3 while passing through steps SP4, SP5, SP17, SP18 and SP21, and displays the rotation angle or the amount of rotation in the coordinates display portion 8 in the numerical value. At this time, the controlled item selected by the cursor 9 is the rotation around the Y-axis, so that only the rotation data displayed as "Y=" in the coordinate display portion 8 changes its value in accordance with the movement of the mouse 3.

Then, at step SP23, the CPU 20 generates the data of amount of rotation or the rotation angle data around the Y-axis based on the same rotation data as which is supplied to the control monitor 5 at step SP22, supplies it to the processor 6 via the serial interface 25, and then proceeds to step SP60 to terminate the operation.

At this time, the processor 6 rotates the object to be operated by a defined amount based on the data of amount of rotation or the rotation angle data around the Y-axis supplied at step SP23.

If a negative result is obtained that the cursor 9 is not positioned in the icon Y at step SP21, the CPU 20 proceeds to step SP24.

At step SP24, the CPU 20 determines whether or not the cursor 9 is positioned in the icon Z of the rotation controlling icon 11. If an affirmative result is obtained that the cursor 9 is positioned in the icon Z, the CPU 20 proceeds to step SP25. At step SP25, the CPU 20 supplies the location data supplied from the mouse 3 to the control monitor 5 in cooperation with the movement of the mouse 3 after one click data being supplied from the mouse 3 while passing through steps SP4, SP5, SP17, SP18, SP21 and SP24, and displays the rotation angle or the amount of rotation at that time on the coordinates display portion 8. At that time, the controlled item selected by the cursor 9 is the rotation around the Z-axis, so that only the rotation data displayed as "Z=" in the coordinate display portion 8 changes its value in accordance with the movement of the mouse 3.

Then, at step SP26, the CPU 20 generates the data of amount of rotation or the rotation angle data around the Z-axis based on the same rotation data as which is supplied to the control monitor 5 at step SP25, supplies it to the processor 6 via the serial interface 25, and then proceeds to step SP60 to terminate the operation.

At this time, the processor 6 rotates the object to be operated by a defined amount based on the data of amount of rotation or the rotation angle data around the Z-axis supplied at step SP26.

Incidentally, at steps SP20, SP23 and SP26, the CPU 20 retains the data of amount of rotation or the rotation angle data in the direction of respective axes at the time when a click data is supplied from the mouse 3, and keeps supplying the data to the processor 6: or the CPU 20 supplies the retainment command data to the processor 6 so as to retain the data of amount of rotation or the rotation angle data in the direction of respective axes at the time when a click data is supplied from the mouse 3.

If a negative result is obtained that the cursor 9 is not positioned in the icon Z at step SP24, the CPU 20 proceeds to step SP27.

At step SP27, the CPU 20 determines whether or not the cursor 9 is positioned in the icon C of the rotation controlling icon 11. If an affirmative result is obtained that the cursor 9 is positioned in the icon C, the CPU 20 proceeds to step SP28.

Incidentally, the determinations by the CPU 20 at steps SP17, SP18, SP21, SP24 and SP27 are executed based on the position of the cursor 9 at the time when the click data is supplied from the mouse 3 at step SP4.

At step SP28, the CPU 20 returns the data of amount of rotation around X-, Y-, and/or Z-axes, X-, Y-, and/or Z-directional rotation angle data set at steps SP18 to SP26 to the initial value, and then supplies the initial value to the processor 6. Then, the CPU 20 proceeds to step SP60 to terminate the operation.

At this time, the processor 6 moves the object to be operated to the position shown by the initial value.

If a negative result is obtained that the cursor 9 is not positioned in the icon C at step SP27, the CPU 20 proceeds to step SP60 to terminate the operation.

If a negative result is obtained that the cursor 9 is not positioned in the rotation controlling icon 11 at step SP17, the CPU 20 proceeds to step SP60 to terminate the operation.

Incidentally, if it is determined that the cursor 9 is not positioned in the SOURCE region, the CPU 20 proceeds to step SP29.

Figure 6:
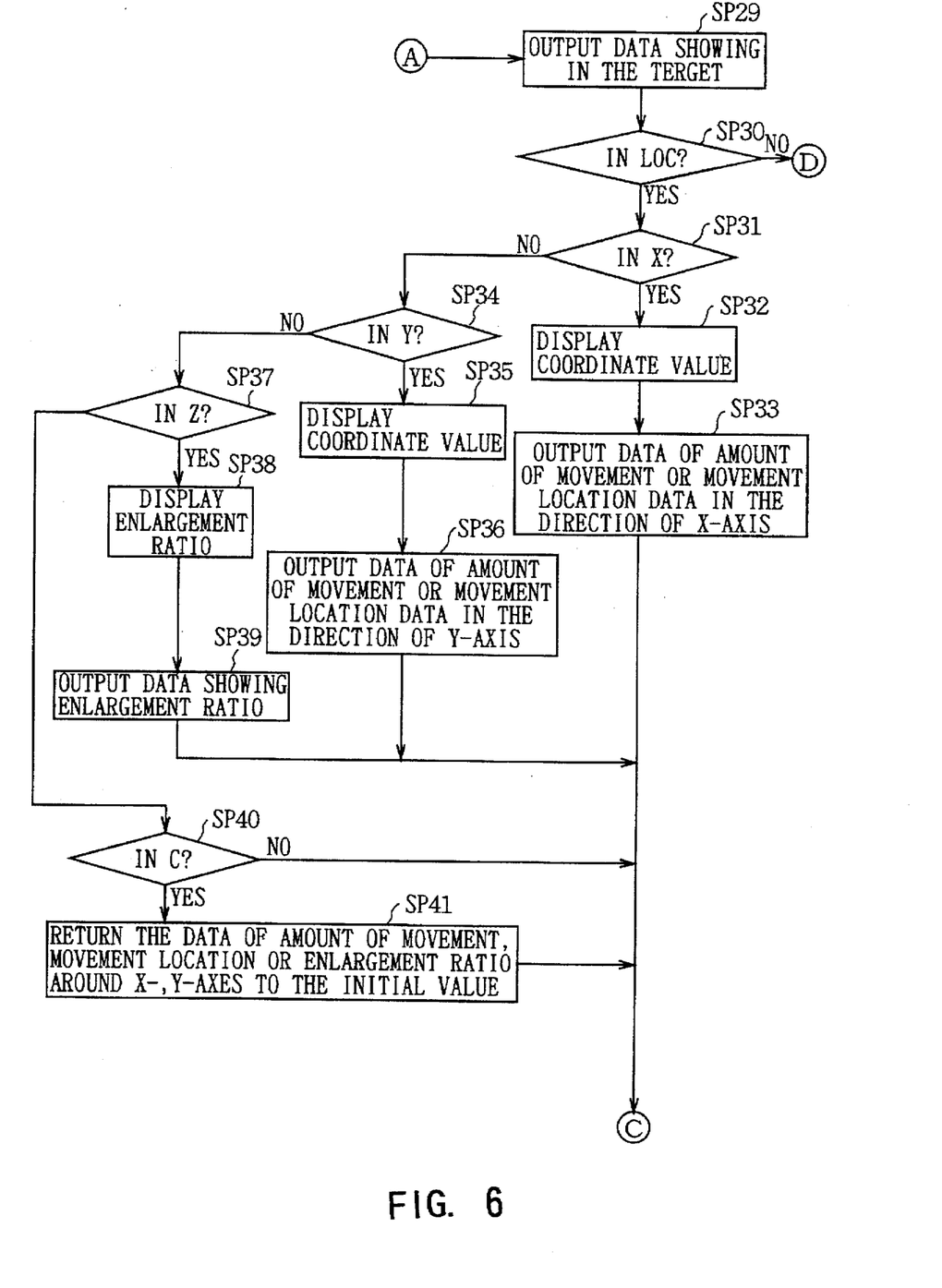

At step SP29, the CPU 20 supplies the data showing that the cursor 9 is positioned in the TARGET region to the processor 6. Then, the processor 6 controls the object to be operated on the TARGET side based on the data of amount of movement, the movement location data, the data of amount of rotation, the rotation angle data or the enlargement ratio data each of which are supplied from the controller 4.

Figure 7:
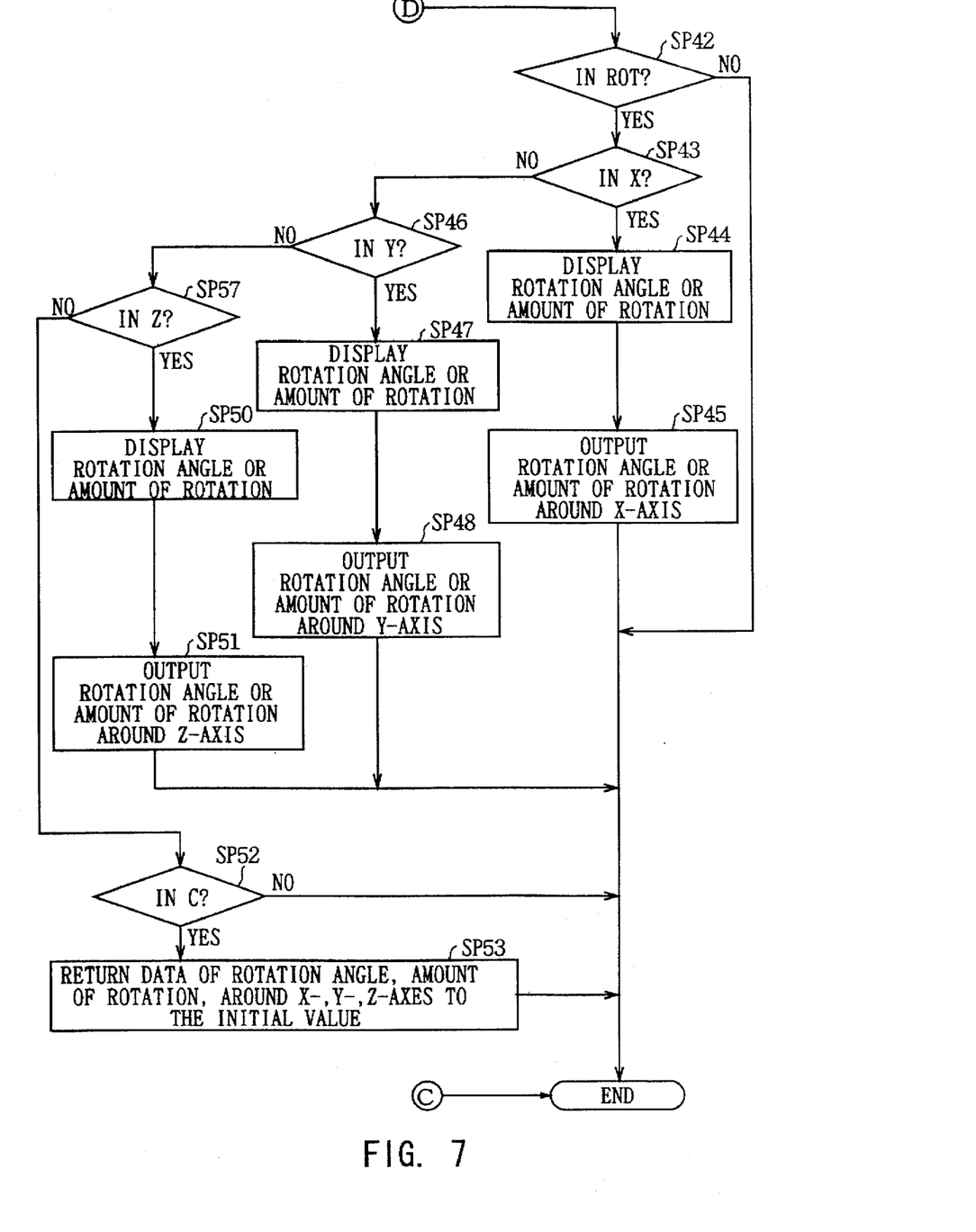

The operations from steps SP30 to SP53 shown in FIGS. 6 and 7 are the same as that of steps SP5 to SP28 except for controlling on the TARGET side, therefore its description is omitted here.

In the above configuration, if the operation cursor 9 is positioned in the region of the desired controlling icon and clicked by the mouse 3, the parameter corresponding to the controlling icon is supplied to the processor 6 to display the image on the output monitor 7, so that it is possible to give special effects to the image while confirming the image on the output monitor 7 and to execute quick selective switching of the various three-dimensional parameters by only operating the mouse 3. Thus, the video effect apparatus 1 which is superior in operation property can be realized.

In the embodiment described above, the icons LOC and ROT are used as controlling icons. However, the present invention is not only limited to this, but a plurality of operation factors such as RATE (magnification), PRS (perspective), SKW (skew), can be additionally provided to realize further complicated movement of the image.

Further in the embedment described above, the controlling icon is displayed with a combination of five icons of LOC, X, Y, C and Z. However, the present invention is not only limited to this, but the controlling icon can be displayed with the other combinations; a combination of three icons of X, Y and Z, and separate icons of LOC, ROT, RATE, PRS, SKW, etc..

Further in the embodiment described above, the controlling icons are displayed on the control monitor 5. However, the present invention is not only limited to this, but the controlling icons for the control monitor 5 can be provided on a part of the output monitor 7. For example, controlling icons can be provided in the lowest portion of the output monitor 7 or displayed in a window display provided in the screen of the output monitor 7.

In the embodiment described above, the present invention is applied to the video effect apparatus 1. However, the present invention is not only limited to this, but also applicable to a CAD (computer aided design), a game apparatus using three-dimensional computer graphics, or the like.

In the embodiment described above, the video effect apparatus 1 in which controlling icons are selected by using a mouse 3 has been described. However, the present invention is not only limited to this, but also applicable to any other two-dimensional information input means such as a tablet, a write pen, a trackball, a joystick, or the like, in place of the mouse 3.

According to the present invention, as stated above, it is possible to produce the three-dimensional parameter input device and the image processing apparatus both of which selectively switch the parameters for controlling three-dimensional movement.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. A three-dimensional parameter input device, comprising:

a monitor;

icon display means for displaying an icon composed of first, second and third regions on said monitor;

input means for inputting a location data and a definition data;

cursor display means for displaying a cursor at the position on the display surface of said monitor corresponding to said location data;

determination means for determining in which region among said first, second and third regions said cursor is positioned when said first definition data is supplied from said input means; and parameter generation means for generating and outputting an X-directional location data or a data of amount of movement in the direction of X-axis from said location data supplied from said input means after the supply of said first definition data when said cursor is positioned in said first region, for generating and outputting a Y-directional location data or a data of amount of movement in the direction of Y-axis from said location data supplied from said input means after the supply of said first definition data when said cursor is positioned in said second region, and for generating and outputting a data showing enlargement ratio from said location data supplied from said input means after the supply of said first definition data when said cursor is positioned in said third region, based on the determination result of said determination means.

2. The three-dimensional parameter input device, according to claim 1, wherein when said second definition data is supplied from said input means, said parameter generation means retains said X-directional location data, said data of amount of movement in the direction of X-axis, said Y-directional location data, said data of amount of movement in the direction of Y-axis, or said enlargement ratio data.

3. The three-dimensional parameter input device, according to claim 1, wherein when said second definition data is supplied from said input means, said parameter generation means outputs a data for retaining said X-directional location data, said data of amount of movement in the direction of X-axis, said Y-directional location data, said data of amount of movement in the direction of Y-axis, or said enlargement ratio data.

4. The three-dimensional parameter input device, according to claim 1, wherein said input means is a mouse, a trackball, or a joystick.

5. A three-dimensional parameter input device, comprising:

a monitor;

icon display means for displaying an icon composed of first, second and third regions on said monitor;

input means for inputting a location data and a definition data;

cursor display means for displaying a cursor at the position on the display surface of said monitor corresponding to said location data;

determination means for determining in which region among said first, second and third regions said cursor is positioned when said first definition data is supplied from said input means; and parameter generation means for generating and outputting a rotation angle data around X-axis or a data of amount of rotation around X-axis from said location data supplied from said input means after the supply of said first definition data when said cursor is positioned in said first region, for generating and outputting a rotation angle data around Y-axis or a data of amount of rotation around Y-axis from said location data supplied from said input means after the supply of said first definition data when said cursor is positioned in said second region, and for generating and outputting a rotation angle data around Z-axis or a data of amount of rotation around Z-axis from said location data supplied from said input means after the supply of said first definition data when said cursor is positioned in said third region, based on the determination result of said determination means.

6. The three-dimensional parameter input device, according to claim 5, wherein when said second definition data is supplied from said input means, said parameter generation means retains said X-directional rotation angle data, said data of amount of rotation around X-axis, said Y-directional rotation angle data, said data of amount of rotation around Y-axis, said Z-directional rotation angle data, or said data of amount of rotation around Z-axis.

7. The three-dimensional parameter input device, according to claim 5, wherein when said second definition data is supplied from said input means, said parameter generation means outputs a data for retaining said X-directional rotation angle data, said data of amount of rotation around X-axis, said Y-directional rotation angle data, said data of amount of rotation around Y-axis, said Z-directional rotation angle data, or said data of amount of rotation around Z-axis.

8. The three-dimensional parameter input device, according to claim 5, wherein said input means is a mouse, a trackball, or a joystick.

9. An image processing apparatus, comprising:

a monitor;

icon display means for displaying an icon composed of first, second and third regions on said monitor;

input means for inputting a location data and a definition data;

cursor display means for displaying a cursor at the position on the display surface of said monitor corresponding to said location data;

determination means for determining in which region among said first, second and third regions said cursor is positioned when said first definition data is supplied from said input means;

parameter generation means for generating and outputting an X-directional location data or a data of amount of movement in the direction of X-axis from said location data supplied from said input means after the supply of said first definition data when said cursor is positioned in said first region, for generating and outputting a Y-directional location data or a data of amount of movement in the direction of Y-axis from said location data supplied from said input means after the supply of said first definition data when said cursor is positioned in said second region, and for generating and outputting a data showing enlargement ratio from said location data supplied from said input means after the supply of said first definition data when said cursor is positioned in said third region, based on the determination result of said determination means; and image processing means for signal processing an input image signal based on a data outputted from said parameter generation means, and for controlling the location and the size of said input image signal on the display screen.

10. An image processing apparatus, comprising:

a monitor;

icon display means for displaying an icon composed of first, second and third regions on said monitor;

input means for inputting a location data and a definition data;

cursor display means for displaying a cursor at the position on the display surface of said monitor corresponding to said location data;

determination means for determining in which region among said first, second and third regions said cursor is positioned when said first definition data is supplied from said input means;

parameter generation means for generating and outputting a rotation angle data around X-axis or a data of amount of rotation around X-axis from said location data supplied from said input means after the supply of said first definition data when said cursor is positioned in said first region, for generating and outputting a rotation angle data around Y-axis or a data of amount of rotation around Y-axis from said location data supplied from said input means after the supply of said first definition data when said cursor is positioned in said second region, and for generating and outputting a rotation angle data around Z-axis or a data of amount of rotation around Z-axis from said location data supplied from said input means after the supply of said first definition data when said cursor is positioned in said third region, based on the determination result of said determination means; and image processing means for signal processing an input image signal based on a data outputted from said parameter generation means, and for controlling the angle on the display screen of said input image signal.

* * * * *